(12) United States Patent
Kadomatsu

(10) Patent No.: US 7,349,127 B2
(45) Date of Patent: Mar. 25, 2008

(54) READING/RECORDING APPARATUS, READING/RECORDING CONTROL METHOD, PROGRAM FOR IMPLEMENTING THE READING/RECORDING CONTROL METHOD, READING APPARATUS, READING CONTROL METHOD, AND PROGRAM FOR IMPLEMENTING THE READING CONTROL METHOD

(75) Inventor: Daiki Kadomatsu, Ibaraki (JP)

(73) Assignee: Canon Kabushiki Kaisha (JP)

( * ) Notice: Subject to any disclaimer, the term of this patent is extended or adjusted under 35 U.S.C. 154(b) by 931 days.

(21) Appl. No.: 10/745,284

(22) Filed: Dec. 23, 2003

(65) Prior Publication Data

US 2004/0190081 A1    Sep. 30, 2004

(30) Foreign Application Priority Data

Dec. 25, 2002    (JP)    ............................. 2002-375141

(51) Int. Cl.
*H04N 1/23*    (2006.01)
*H04N 1/024*    (2006.01)
*H04N 1/04*    (2006.01)

(52) U.S. Cl. .................. 358/296; 358/472; 358/474; 358/496

(58) Field of Classification Search ................ 358/296, 358/472, 474, 496, 498; 400/605; 271/9.05
See application file for complete search history.

(56) References Cited

U.S. PATENT DOCUMENTS 5,651,623 A * 7/1997 Stodder et al. ............. 400/605
5,954,326 A * 9/1999 Gaarder et al. ............ 271/9.02
6,029,970 A * 2/2000 Hwang ....................... 271/9.08
6,520,700 B1 * 2/2003 Iwata ......................... 400/582
6,929,414 B2 * 8/2005 Kadomatsu ............. 400/608.2

FOREIGN PATENT DOCUMENTS

| JP | 60016763  | * | 1/1985  |
| JP | 01093866  | * | 4/1989  |
| JP | 09193478  | * | 7/1997  |
| JP | 200299767 | * | 10/2000 |

* cited by examiner

*Primary Examiner*—Houhang Safaipour
(74) *Attorney, Agent, or Firm*—Rossi, Kimms & McDowell LLP

(57) ABSTRACT

There is provided a reading/recording apparatus which is miniaturized, by having a reading device and a recording device share a moving space on a shared conveying path used as both a conveying path for an original and a conveying path for a recording sheet, and which is capable of carrying out an error removal process such as a jam removal process in a manner discriminating whether an original or a recording sheet remains on the shared conveying path, without an original being damaged. The reading device is freely movable between a reading position on the shared conveying path and a reading standby position away from the reading position, and reads an image of the original at the reading position. The recording device is freely movable between a recording position on the shared conveying path and a recording standby position away from the recording position, and records an image on the recording sheet at the recording position. It is determined whether a conveying medium detected remaining on the shared conveying path by a conveying medium detecting sensor is the original or the recording sheet. The original remaining on the shared conveying path is discharged without causing the reading unit to move, when the detected conveying medium remaining on the shared conveying path is the original.

12 Claims, 11 Drawing Sheets

READING/RECORDING APPARATUS, READING/RECORDING CONTROL METHOD, PROGRAM FOR IMPLEMENTING THE READING/RECORDING CONTROL METHOD, READING APPARATUS, READING CONTROL METHOD, AND PROGRAM FOR IMPLEMENTING THE READING CONTROL METHOD

BACKGROUND OF THE INVENTION

1. Field of the Invention

The present invention relates to a reading/recording apparatus, a reading/recording control method, a program for implementing the reading/recording control method, a reading apparatus, a reading control method, and a program for implementing the reading control method.

2. Description of the Related Art

In recent years, as terminal apparatuses have been made smaller in size, there have also been demands for miniaturization of information terminal apparatuses. In particular, in a reading/recording apparatus such as a facsimile apparatus for domestic use, a sheet conveying mechanism used for a reading operation and a sheet conveying mechanism used for a recording operation are completely separate from each other, so that a space where a reading unit reads an original (document) during transmission is separate from a space where a recording unit performs the recording operation during reception.

FIG. 11 is a cross-sectional view showing the construction of a conventional reading/recording apparatus. In this conventional reading/recording apparatus, recording sheets 301 are placed on a recording sheet holding member 303 and are fed sheet by sheet by a recording sheet feeding roller 304 and a separating mechanism. The fed recording sheet is conveyed to a recording section 306 by a conveying roller 305 and is discharged from the apparatus (in the direction shown by the arrow B in FIG. 11) by a discharge roller 307 while an image is being formed on the recording sheet by a recording section such as an inkjet cartridge.

On the other hand, originals 302 are placed on an original holding member 308 and are set on a wedge-shaped abutting section formed of an original separating roller 309 and a separating arm 313. When the original separating roller 309 rotates according to an image reading instruction, out of the originals held at the abutting section, only an original in contact with the original separating roller 309 is separated using friction and is conveyed.

The separated and conveyed original 302 is further conveyed by an original feeding roller 310, a discharge roller 312, and opposing rollers while being held therebetween. While an image on the original 302 is being read by a contact image sensor 311, the original 302 is discharged from the apparatus (in the direction shown by the arrow A in FIG. 11).

For a reading/recording apparatus such as a copier or a facsimile apparatus, various functions and improvements have been implemented to make such apparatus more convenient to use, according to demands from customers. One of such demands is for miniaturization of the apparatus. For users who wish to make effective use of limited space, apparatus size is especially important when purchasing equipment.

However, in the conventional reading/recording apparatus described above, the sheet conveying mechanism for the reading operation and the sheet conveying mechanism for the recording operation are completely separate from each other, that is, the space in which the reading unit reads the original during transmission is separate from the space in which the recording unit performs the recording operation during reception, so that it is necessary to provide separate physical spaces for the reading operation and the recording operation. This makes it difficult to miniaturize the apparatus.

On the other hand, there is a known technique for reducing apparatus size by using a single reading/recording path mechanism with a shared conveying path on which both originals and recording sheets are conveyed. Specifically, by conveying originals using the same conveying mechanism used for conveying recording sheets, it is possible to omit a feed roller, discharge roller, original driving motor, original detecting sensor, and the like that are used for conveying originals. However, in the case of an inkjet reading/recording apparatus where recording is performed by moving the recording unit, it is necessary to drive the reading unit and the recording unit in different spaces, so that a sufficient reduction in apparatus size cannot be made.

To further miniaturize a reading/recording apparatus, studies are being performed to make the reading unit freely movable between a reading position located on a shared conveying path for conveying originals and recording sheets and a reading standby position receded from the reading position where the reading unit waits until a read instruction is issued and make the recording unit that moves in the main scanning direction and the reading unit share a moving space. However, in the event that there occurs such an error that a reading operation or a recording operation is stopped for some cause, such as a paper jam, power failure occurring during the reading operation or the recording operation, or forced stoppage of the reading operation or the recording operation, while an original remains on the shared conveying path, if a jam removal process is carried out in a manner irrespective of whether an original or a recording sheet remains on the shared conveying path, there is a fear that the original is damaged by the reading unit moving from the reading position to the reading standby position when the above-mentioned error occurs during the reading operation, for example. Also, in the case where a recording operation is performed with an original still present on the conveying path, there is the risk of the original being damaged by the recording unit moving in the main scanning direction.

SUMMARY OF THE INVENTION

It is an object of the present invention to provide a reading/recording apparatus and a reading/recording control method which is miniaturized, by having a reading device and a recording device share a moving space on a shared conveying path used as both a conveying path for an original and a conveying path for a recording sheet, and which is capable of carrying out an error removal process such as a jam removal process in a manner discriminating whether an original or a recording sheet remains on the shared conveying path, without an original being damaged, as well as a program for implementing the reading/recording control method, and a program for implementing the reading control method.

To attain the above object, in a first aspect of the present invention, there is provided a reading/recording apparatus comprising a shared conveying path used as both a conveying path for an original and a conveying path for a recording medium, an original conveying device that conveys the original to a reading position on the shared conveying path, a reading device that is freely movable between the reading position and a reading standby position away from the reading position and reads an image of the original at the reading position, a recording medium conveying device that conveys the recording medium to a recording position on the shared conveying path, a recording device that is freely movable between the recording position and a recording standby position away from the recording position, and records an image on the recording medium at the recording position, a conveying medium detecting device that detects a conveying medium remaining on the shared conveying path, a remaining conveying medium determining device that determines whether the detected conveying medium remaining on the shared conveying path is the original or the recording medium, a discharge device that discharges the conveying medium remaining on the shared conveying path, and a control device that provides control to cause the discharge device to discharge the original remaining on the shared conveying path without causing the reading device to move, when the remaining conveying determining device determines that the detected conveying medium remaining on the shared conveying path is the original.

According to the first aspect of the present invention, for example, in a multifunction communication apparatus which is miniaturized, by having the reading device and the recording device share a moving space on a shared conveying path used as both a conveying path for an original and a conveying path for a recording sheet, in the event that there occurs such an error that a reading operation or a recording operation is stopped for some cause, such as a paper jam, power failure occurring during the reading operation or the recording operation, or forced stoppage of the reading operation or the recording operation, while a conveying medium remains on the shared conveying path, it is possible to carry out an error removal process in a manner discriminating whether an original or a recording sheet remains on the shared conveying path, without an original being damaged.

Preferably, the control device brings the reading device into an initial state by causing the reading device to the reading standby position, after the conveying medium remaining on the shared conveying path is discharged by the discharge device.

Also preferably, the reading/recording apparatus comprises an original detecting device that detects whether there is an original to be conveyed to the shared conveying path, and the control device is operable when the remaining conveying medium determining device determines that the conveying medium remaining on the shared conveying path is the original, to cause the discharge device to discharge the original determined to be the conveying path remaining on the shared conveying path, and discharge the original detected to be the original to be conveyed by the original detecting device until the original to be conveyed is no longer detected.

Also preferably, the reading/recording apparatus comprises a discharge instructing device that gives an instruction for discharging the conveying medium, and the control device is responsive to the instruction for discharging the conveying medium given by the discharge instructing device, for causing the discharge device to discharge the conveying medium remaining on the shared conveying path.

Also preferably, the reading/recording apparatus comprises a notifying device that notifies that there is an original remaining on the shared conveying path.

Also preferably, the reading/recording apparatus comprises a rotary shaft extending in a main scanning direction, and the reading device is freely rotatable about the rotary shaft between the reading position and the reading standby position, and the control device is operable when an image of the original at the reading position on the shared conveying path has been read by the reading device, to cause the reading device to move to the reading standby position away from the reading position.

Also preferably, the reading device comprises an image detecting device that detects an image of the original, and a white reference determining device that determines a white reference level of the image detected by the image detecting device, and the original conveying device is operable when the reading device reads the image of the original at the reading position, to cause the original to pass between the image detecting device and the white reference determining device.

Also preferably, the control device is operable when the conveying medium remaining on the shared conveying path is detected to be the recording medium by the conveying medium detecting device, to cause the discharge device to discharge the recording medium as the conveying medium remaining on the shared conveying path.

More preferably, the control device is operable when a predetermined operation has been carried out after discharge of the recording medium as the conveying medium remaining on the shared conveying path, to shift the reading/recording apparatus into a recording mode.

Also preferably, the recording device shares a moving space on the shared conveying path with the reading device.

To attain the above object, in a second aspect of the present invention, there is provided a reading/recording control method for a reading/recording apparatus including a shared conveying path used as both a conveying path for an original and a conveying path for a recording medium, a reading device that is freely movable between a reading position and a reading standby position away from the reading position and reads an image of the original at the reading position, and a recording device that is freely movable between a recording position and a recording standby position away from the recording position, and records an image on the recording medium at the recording position, the method comprising an original conveying step of conveying the original to the reading position on the shared conveying path, a reading step of causing the reading device to read an image of the original at the reading position, a recording medium conveying step of conveying the recording medium to the recording position on the shared conveying path, a conveying medium detecting step of detecting a conveying medium remaining on the shared conveying path, a remaining conveying medium determining step of determining whether the detected conveying medium remaining on the shared conveying path is the original or the recording medium, and a discharging step of discharging the original as the conveying medium remaining on the shared conveying path without causing the reading device to move, when in the remaining conveying determining step it is determined that the detected conveying medium remaining on the shared conveying path is the original.

To attain the above object, in a third aspect of the present invention, there is provided a reading apparatus comprising a conveying path for conveying an original, an original conveying device that conveys the original to a reading position on the conveying path, a reading device that is freely movable between the reading position and a reading standby position away from the reading position and reads an image of the original at the reading position, an original detecting device that detects the original remaining on the conveying path, a discharge device that discharges the original remaining on the conveying path, and a control device that provides control to cause the discharge device to discharge the original remaining on the conveying path without causing the reading device to move, when the original detecting device detects the original remaining on the conveying path.

To attain the above object, in a fourth aspect of the present invention, there is provided a reading control method for a reading apparatus including a conveying path for conveying an original, and a reading device that is freely movable between a reading position and a reading standby position away from the reading position and reads an image of the original at the reading position, the method comprising an original conveying step of conveying the original to the reading position on the conveying path, a reading step of causing the reading device to read the original at the reading position, an original detecting step of detecting the original remaining on the conveying path, and a discharging step of discharging the original remaining on the conveying path without causing the reading device to move, when in the original detecting step the original remaining on the conveying path is detected.

To attain the above object, in a fifth aspect of the present invention, there is provided a program for causing a computer to execute a reading/recording method according to the second aspect of the present invention.

To attain the above object, in a sixth aspect of the present invention, there is provided a program for causing a computer to execute a reading method according to the fourth aspect of the present invention.

The above and other objects of the present invention will become more apparent from the following detailed description taken in conjunction with the accompanying drawings.

DETAILED DESCRIPTION OF THE PREFERRED EMBODIMENTS

The present invention will now be described in detail with reference to the accompanying drawings showing a preferred embodiment thereof.

Figure 1:
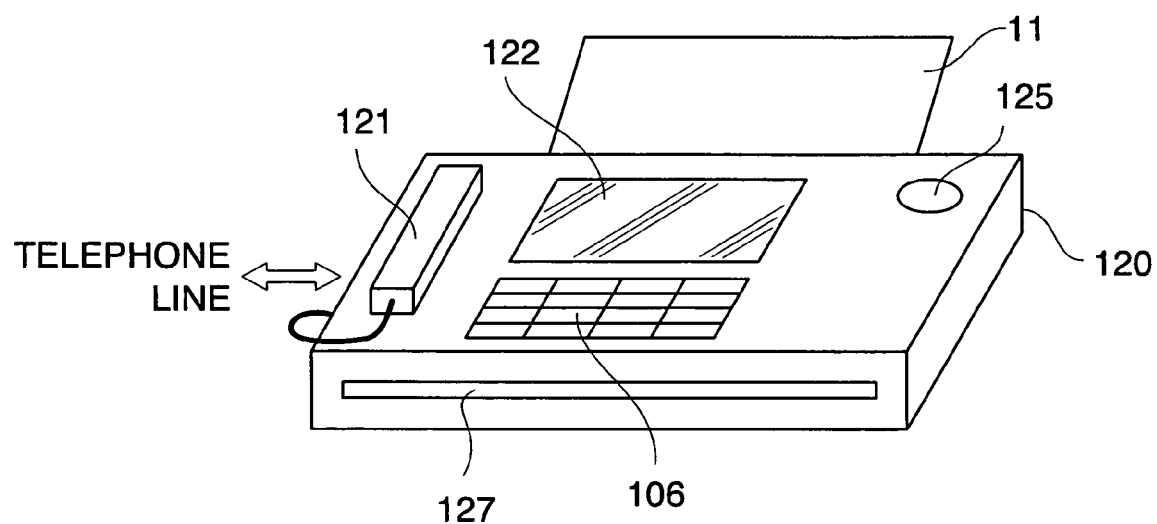
FIG. 1 is a perspective view showing the external appearance of a multifunction communication apparatus as a reading/recording apparatus according to a first embodiment of the present invention.

FIG. 1 is a perspective view showing the external appearance of a reading/recording apparatus according to a first embodiment of the present invention. The reading/recording apparatus according to the present embodiment is applied to a multifunction communication apparatus that has a facsimile communication function and a copying function. This multifunction communication apparatus has a casing 120 with a discharge opening 127 provided in a front side thereof and an original tray 11 provided on a rear side thereof. A handset 121, a display 122, an operating section 106, a conveying medium discharge button (discharge key) 125, and so forth are provided on an upper surface of the casing 120.

The display 122 displays the state of the multifunction communication apparatus, a telephone number, and so forth. The operating section 106 is comprised of a plurality of keys and is used to input a telephone number or various kinds of setting information and to give instructions for operations. The conveying medium discharge button 125 is pressed to discharge an original or a recording sheet. For example, when there occurs such an error that a reading operation or a recording operation is stopped for some cause, such as a paper jam, power failure occurring during the reading operation or the recording operation, or forced stoppage of the reading operation or the recording operation, while a conveying medium remains on the shared conveying path, the conveying medium discharge button 125 is pressed to discharge the conveying medium and hence remove the error.

Figure 2:
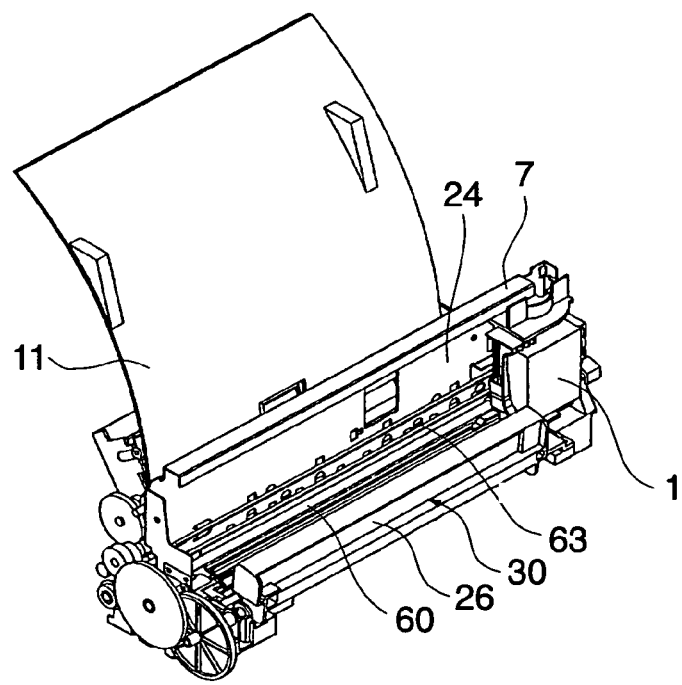
FIG. 2 is a perspective view showing the internal construction of the multifunction communication apparatus of FIG. 1.
Figure 3:
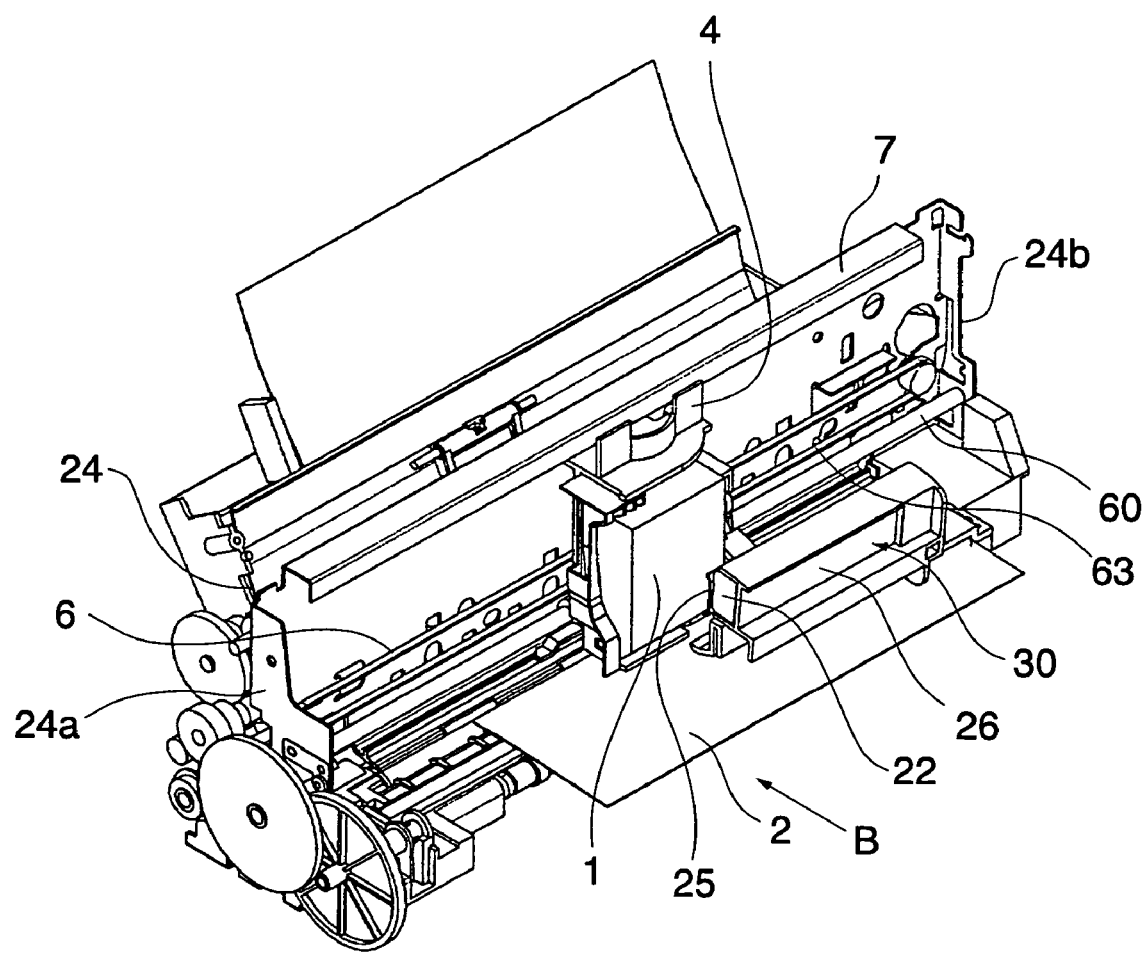
FIG. 3 is a perspective view showing the internal construction of the multifunction communication apparatus of FIG. 1 in a state where a recording unit is operating.
Figure 4:
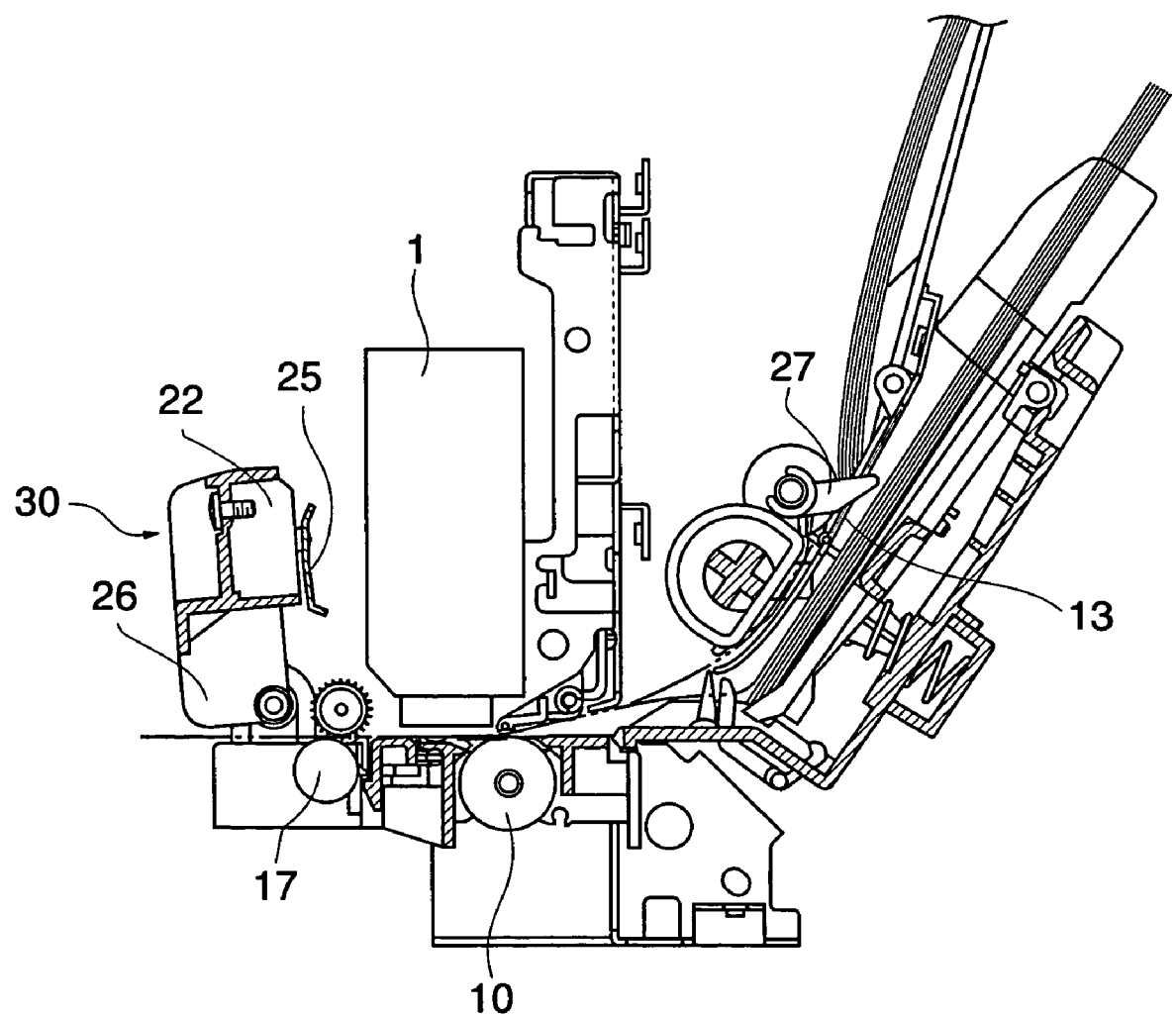
FIG. 4 is a cross-sectional side view showing the internal construction of the multifunction communication apparatus of FIG. 1 in the state where the recording unit is operating.
Figure 5:
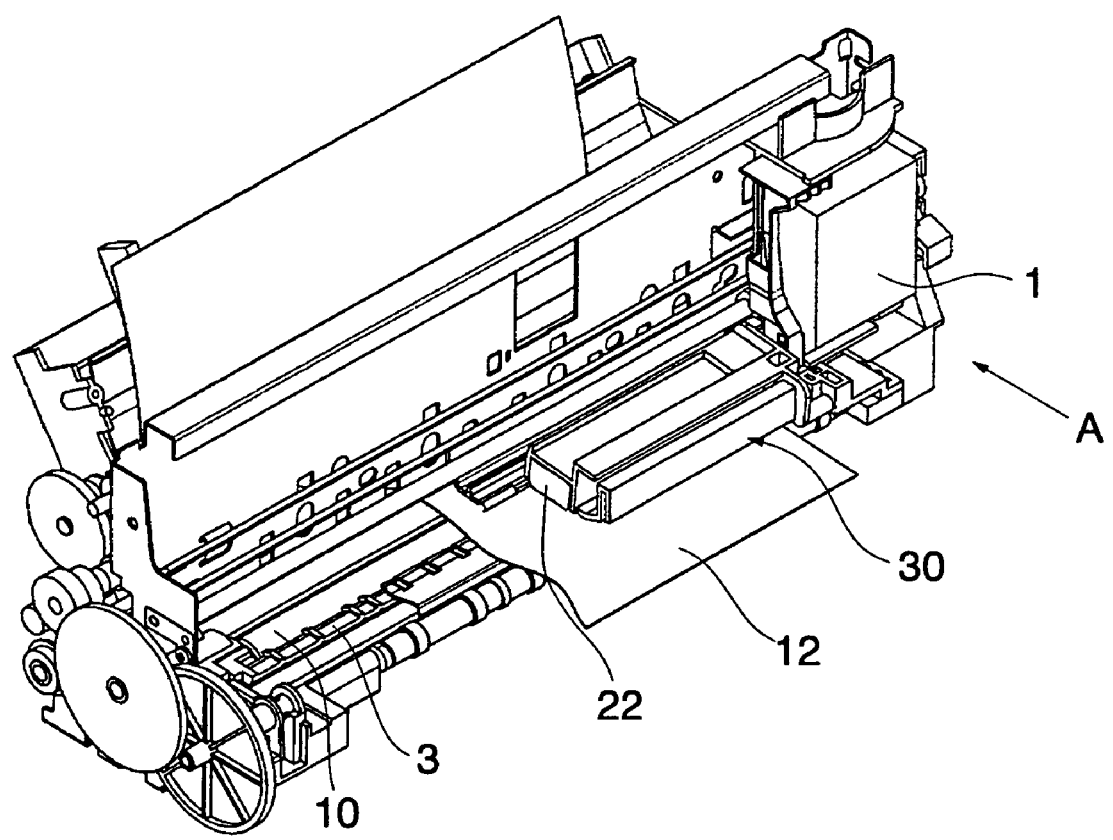
FIG. 5 is a perspective view showing the internal construction of the multifunction communication apparatus of FIG. 1 in a state where the reading unit is operating.
Figure 6:
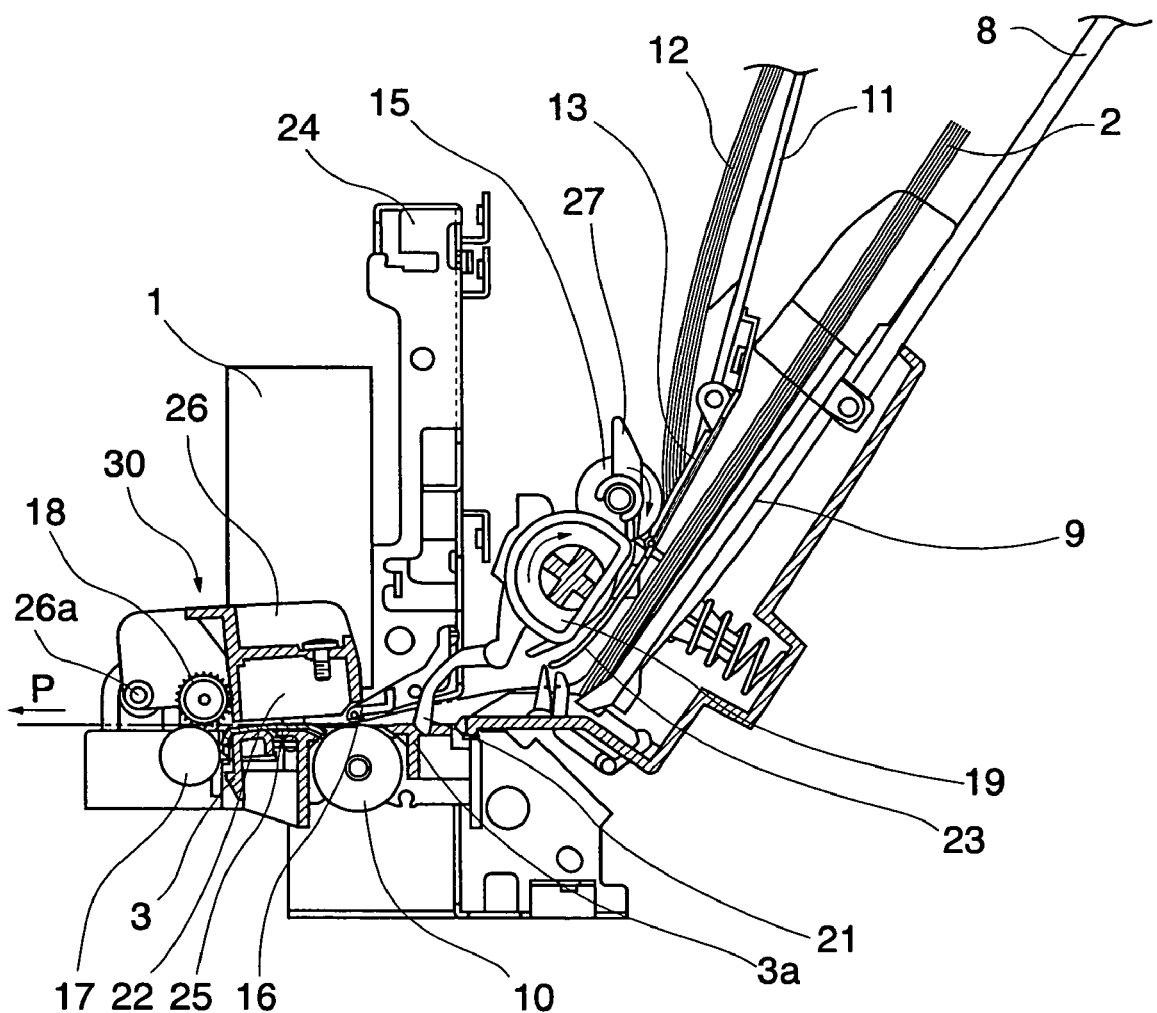
FIG. 6 is a cross-sectional side view showing the internal construction of the multifunction communication apparatus of FIG. 1 in the state where the reading unit is operating.

FIG. 2 is a perspective view showing the internal construction of the multifunction communication apparatus of FIG. 1. FIG. 2 shows a state where neither a recording sheet nor an original has been set and neither a reading unit nor a recording unit is operating, so that both the units are located in receded positions. FIG. 3 is a perspective view showing the internal construction of the multifunction communication apparatus of FIG. 1 in a state where the recording unit is operating. FIG. 4 is a cross-sectional side view showing the internal construction of the multifunction communication apparatus of FIG. 1 in a state where the recording unit is operating. FIG. 5 is a perspective view showing the internal construction of the multifunction communication apparatus of FIG. 1 in a state where the reading unit is operating. FIG. 6 is a cross-sectional side view showing the internal construction of the multifunction communication apparatus of FIG. 1 in a state where the reading unit is operating.

In FIGS. 2 to 6, reference numeral 1 designates an ink cartridge (the recording unit) that carries out recording, 3 a platen that is disposed in opposition to a surface of an original during a reading operation and to a surface of a recording sheet during a recording operation; 3a a platen supporting member that supports the platen 3; 8 a recording sheet tray on which recording sheets 2 are placed; 9 a pressing plate that presses the recording sheets 2 onto a recording sheet separating roller 19 when a recording sheet is to be separated; 10 a feed roller that feeds a conveyed medium (an original or a recording sheet) when reading or recording is carried out; 11 an original tray that holds originals, 13 a separating arm that separates an original 12; 15 an original separating roller that applies a force required to separate an original; 16 a pinch roller that supplements a driving force of the feed roller 10 during the feeding of the conveyed medium; 17 a discharge roller that discharges the conveyed medium out of the apparatus during reading and recording; 18 a spur that supplements a driving force of the discharge roller 17 when the conveyed medium is discharged; 19 a recording sheet separating roller that applies a force required to separate a recording sheet; and 21 a conveyed medium detecting sensor (paper edge sensor or "PES") that detects the presence of a conveyed medium during reading or recording.

Further, reference numeral 22 designates a contact image sensor (CS) that carries out a reading operation; 23 an original lower guide member that guides an original 12; 24 a chassis; 25 a white reference determining member that determines a white reference level of an image read by the contact image sensor (CS) 22 during an operation that reads an original; and 26 a contact image sensor holder (CS holder) that supports the CS 22 and the white reference determining member 25, and is also for free rotation with respect to the apparatus main body about a rotary shaft 26a extending in a main scanning direction. A reading unit 30 is comprised of the CS holder 26, the CS 22, and the white reference determining member 25. During a reading operation, the CS holder 26 rotates to a reading position close to a recording section (that is, a recording position) on the platen 3, and an image of the original that passes a shared conveying path is read by the CS 22. On the other hand, during a recording operation, the CS holder 26 rotates away from the reading position on the platen 3 to a reading standby position, and a recording unit 1 that is freely movable on the platen 3 in the main scanning direction carries out a recording operation on the recording sheet that passes the shared conveying path.

Reference numeral 27 designates an original detecting sensor (DS: document sensor) used for detecting the presence of an original on the original tray 11. During a reading operation, a document is detected by the DS 27 and the PES 21 detects whether a conveyed medium (an original or a recording sheet) has passed a predetermined position on the shared conveying path. It should be noted that when the apparatus is in reading mode in response to a start request for a reading operation being issued, in which an original is conveyer, if the PES 21 is not turned on and the DS 27 remains on, or if both the PES 21 and the DS 27 has been continued to be ON over a predetermined time period, it is judged that an abnormality has occurred during conveying of the original, and an original jam flag is set.

The recording unit 1 is provided therein with an ink tank and an ink head (recording head), and records an image based on image information by injecting ink from the ink tank onto a recording sheet 2 through nozzles provided on the ink head. The recording unit 1 is detachably attached to a carriage 4 that is guided by a guide rail 7 that is formed in an inverted U-shape integrally with the top of the chassis 24 and a guide shaft 60 supported by side plates 24a, 24b at both ends of the chassis 24. The carriage 4 is fixed to a carriage belt 63 and is driven by a carriage motor to move the recording unit 1 in the main scanning direction. In the case where an abnormality is detected in the state of the recording sheet separating roller 19 or in the sheet conveyance during a recording operation carried out by the recording unit 1, a recording sheet jam flag is set.

The reading operation and recording operation of the multifunction communication apparatus with the above construction will be described next. First, when an original 12 is set on the original tray 11 during a reading operation, the original 12 is detected by the original detecting sensor (DS) 27 that is located near the original separating roller 15.

If the user gives an instruction for the start of a reading operation via the operating section 106 in a state where the original 12 has been detected by the original detecting sensor 27, "reading mode" indicative of a reading operation being carried out is stored in a storage section 107 shown in FIG. 7 (described later) as an operation mode, and a reading operation is started. Under the control of a CPU 100 in FIG. 7, the original separating roller 15 is driven to cause one original 12 to be separated by the separating arm 13, and the separated original is fed to the reading position.

At the same time, the CS holder 26 is rotated about the rotary shaft 26a towards the platen 3 by the driving force of the feed roller 10, to bring the CS 22 to the reading position. In this state, the feed roller 10 conveys the original 12 on the shared conveying path and the CS 22 reads an image from the original 12 until a trailing edge of the original 12 is detected by the PES 21. The image read by the CS 22 is converted into image information by a predetermined method and the image information is stored in the storage section 107 shown in FIG. 7.

When the reading of the image from the original 12 has been completed, the original 12 is discharged from the apparatus by the discharge roller 17. When the user has given an instruction for a reading operation for a plurality of originals, after the discharging of an original has been completed, the next original 12 is separated and fed and an image of this next original 12 is read in the same way. When the reading of images has been completed for the number of originals 12 indicated by the user, the CS holder 26 is finally rotated to the reading standby position away from the reading position on the platen 3, and the reading operation is completed.

Next, in a recording operation, when the user gives an instruction for the start of a recording operation using the operating section 106, if the CS holder 26 has been rotated to the reading position, before the recording operation starts, the CS holder 26 is receded from the reading position to the reading standby position. After this, "recording mode" indicative of a recording operation being carried out is stored in the storage section 107 shown in FIG. 7 as the operation mode. Consequently, the ink cartridge (recording unit) 1 can move in the main scanning direction at and in vicinity of the recording section on the platen 3, so that recording can be carried out on the recording sheet 2 that passes on the shared conveying path.

Figure 7:
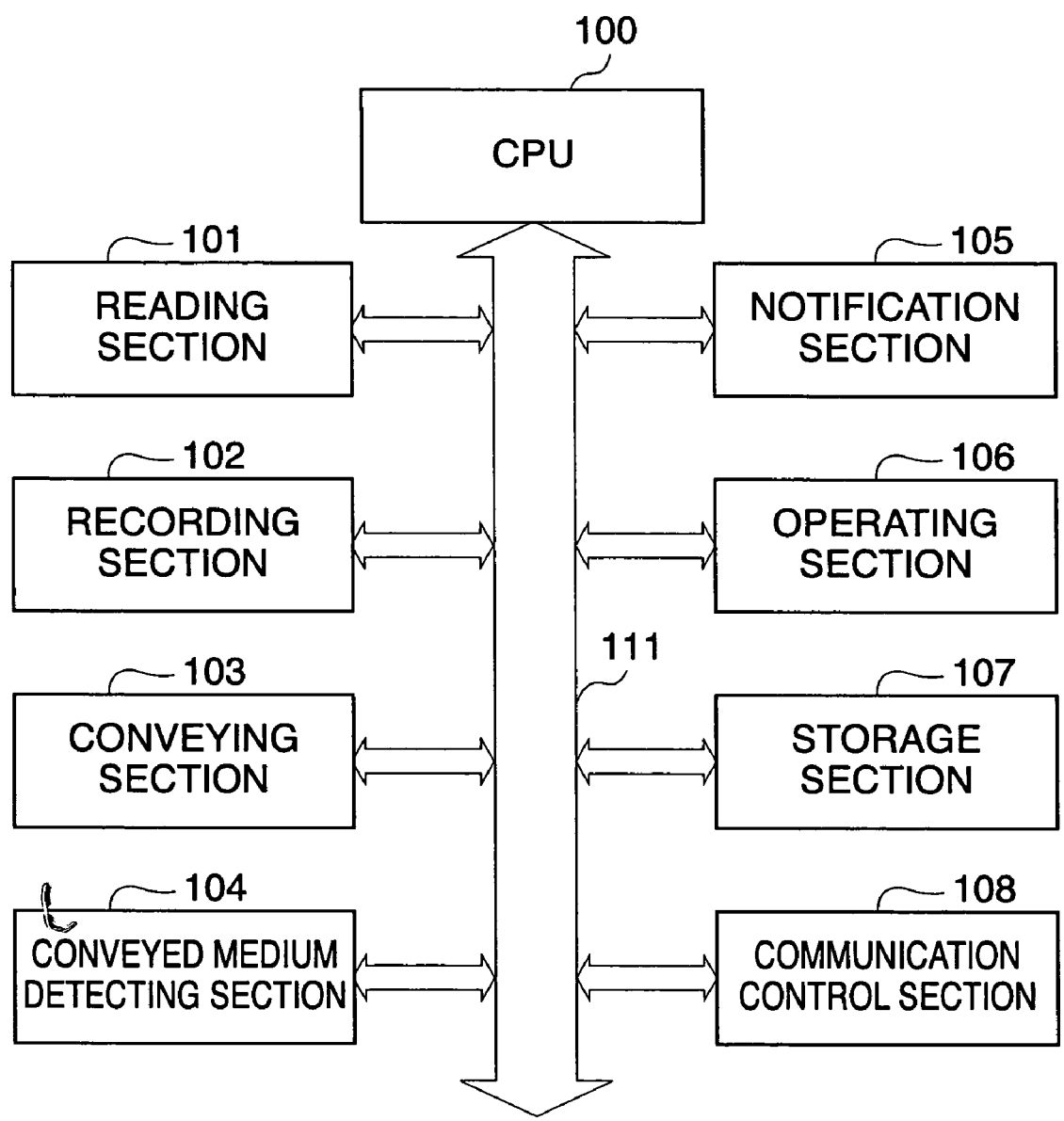
FIG. 7 is a block diagram showing the electrical construction of the multifunction communication apparatus of FIG. 1.

After this, recording sheets 2 are placed on the recording sheet tray 8 and when one recording sheet 2, out of the recording sheets 2 that are pressed by the pressing plate 9, has been separated by the recording sheet separating roller 19 under the control of the CPU 100 shown in FIG. 7, the recording sheet 2 is fed to the recording section (recording position) on the platen 3.

Next, until the trailing edge of the recording sheet 2 conveyed by the feed roller 10 is detected by the PES 21, the recording unit 1 records an image on the recording sheet 2 based on image information stored in the storage section 107 shown in FIG. 7. When the recording of the image has been completed, the recording sheet is discharged from the apparatus by the discharge roller 17. When a recording operation is to be performed for a plurality of recording sheets 2, after the discharging of a recording sheet on which an image has been recorded has been completed, the processes for separating and feeding the next recording sheet 2 on which an image is to be recorded, recording an image, and discharging the recording sheet are repeated for the remaining number of sheets.

Here, when the recording unit 1 is not performing a recording operation, the recording unit 1 stands by at a home position (recording standby position) (a position shown by the arrow A in FIG. 5) and a cap is placed over the recording head of the recording unit 1 to prevent clogging of the recording head caused by drying of the ink. When a recording operation is carried out, the cap is removed, the recording unit 1 is moved to a recovering operation position (a position shown by the arrow B in FIG. 3), and after an initialization operation, such as a recovering operation of the recording head, has been performed, the recording operation starts. Aside from the initialization operation of the recording unit 1 described above, even if no user instruction has been given via the operating section 106, other initialization operations (such as a recovering operation of the ink cartridge 1 and a remaining ink detecting operation) are executed according to predetermined conditions. Also, as for the timing for carrying out a recording operation, the recording unit 1 starts an initialization operation when the PES 21 detects a recording sheet 2.

In this way, in the multifunction communication apparatus in which during a reading operation the reading unit 30 including the CS holder 26 moves in the same space in which the recording unit 1 moves during a recording operation, in the event that there occurs such an error that a reading operation or a recording operation is stopped for some cause, such as a paper jam, power failure occurring during the reading operation or the recording operation, or forced stoppage of the reading operation or the recording operation, while an original 12 remains on the shared conveying path, there was conventionally the risk that the original 12 is damaged by the reading unit 30 moving from the reading position to the reading standby position. However, in the present embodiment, the above situation is avoided by carrying out an appropriate jam removal process as described hereinbelow. It should be noted that a reading operation or a recording operation that is being performed can be forcibly stopped by the operator carrying out a predetermined operation, even before completion of the reading operation or the recording operation.

FIG. 7 is a block diagram showing the electrical construction of the multifunction communication apparatus of FIG. 1. This multifunction communication apparatus is comprised of the CPU 100, a reading section 101 including the reading unit 30 that reads an original, a recording section 102 including the recording unit 1 that records an image on a recording sheet based on image information received via a facsimile communication and/or image information of an original read by the reading unit 30, a conveying section 103 that conveys originals and recording sheets along the shared conveying path, a conveyed medium detecting section 104 including the PES 21 and the DS 27, a notification section 105 that gives a notification when a conveyed medium has been detected by the conveyed medium detecting section 104 and also notifies a user of various states of the apparatus, an operating section 106 that is operated by the user to input various information and to give instructions for operations of the apparatus, a communication control section 108 that controls transmission and reception of image information and communication carried out by the handset 121 via a telephone line, and the storage section 107, with these various components being interconnected via a bus 111. An operation mode such as "reading mode" or "recording mode" is stored in the storage section 107, along with various states of the apparatus and image information based on images read by the reading unit 30. A control program, described later, is also stored in a ROM inside the storage section 107.

Figure 8:
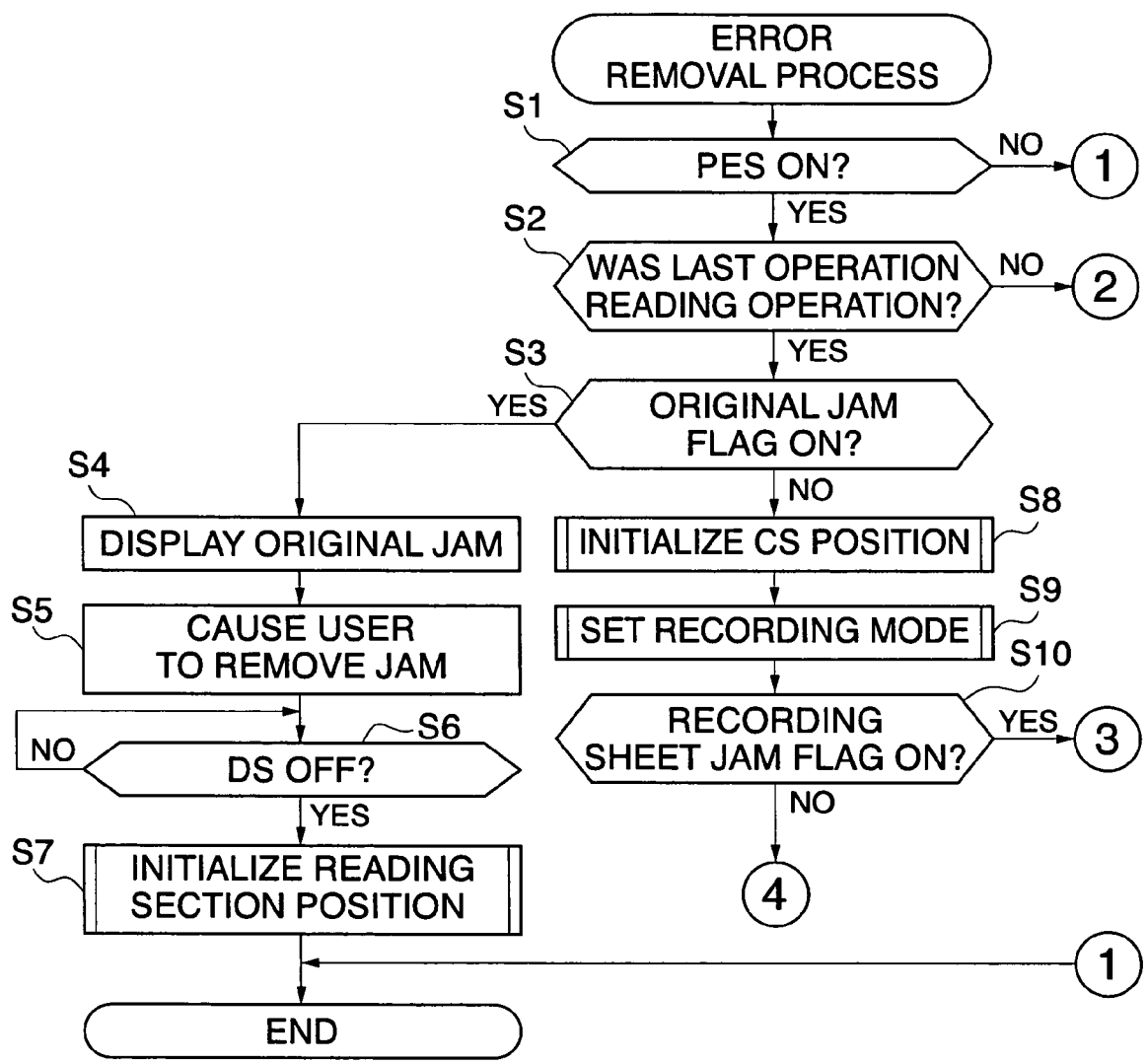
FIG. 8 is a flowchart showing the procedure of an error removal process carried out in the event that there occurs such an error that a reading operation or a recording operation is stopped for some cause, such as a paper jam, power failure occurring during the reading operation or the recording operation, or forced stoppage of the reading operation or the recording operation, while a conveying medium remains on the shared conveying path in the multifunction communication apparatus of FIG. 1.
Figure 9:
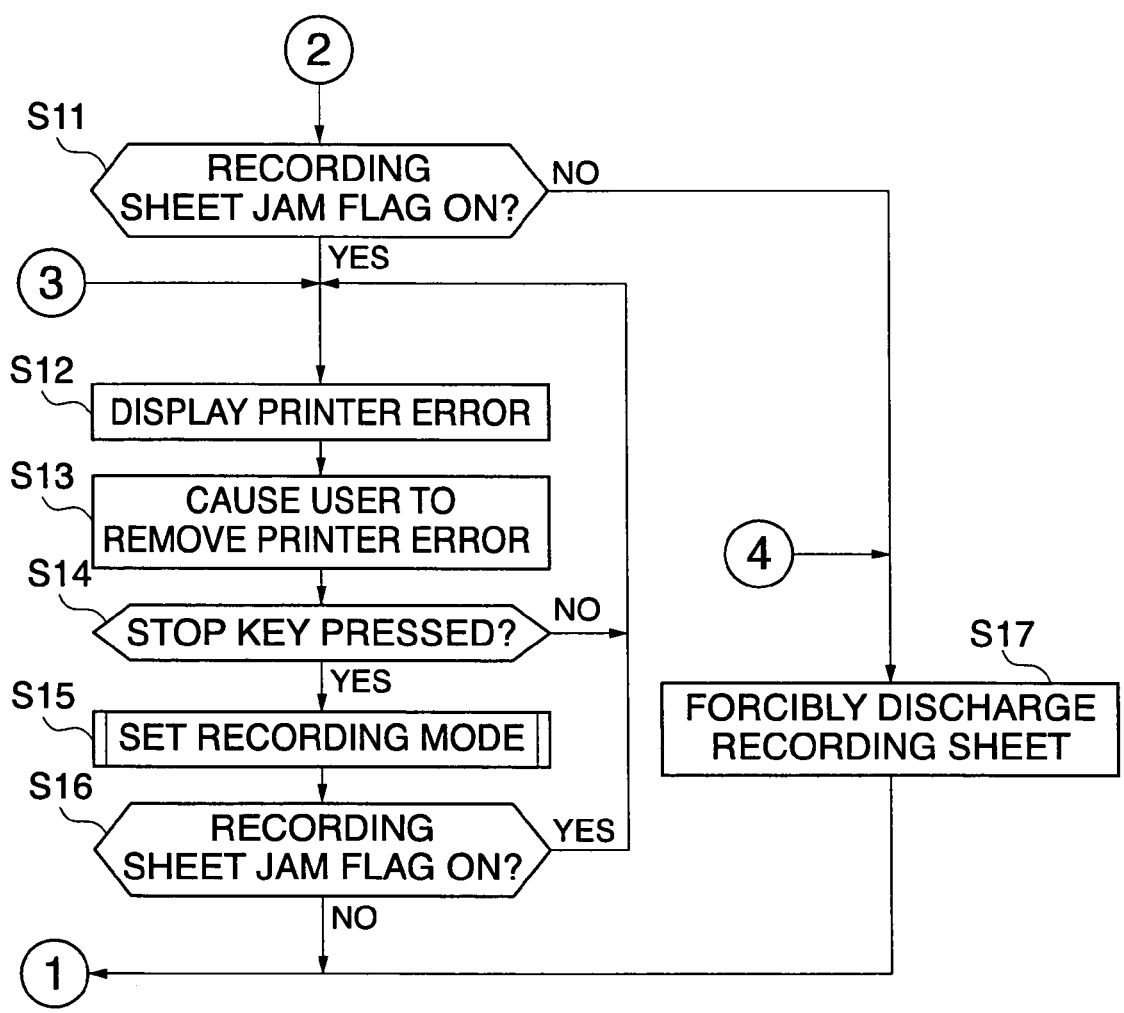
FIG. 9 is a continued part of the flowchart of FIG. 8.

FIGS. 8 and 9 are flowcharts showing the procedure of an error removal process carried out in the event that there occurs such an error that a reading operation or a recording operation is stopped for some cause, such as a paper jam, power failure occurring during the reading operation or the recording operation, or forced stoppage of the reading operation or the recording operation, while a conveying medium remains on the shared conveying path in the multifunction communication apparatus of FIG. 1. A control program for carrying out this process is stored in the ROM inside the storage section 107, described earlier, and is repeatedly executed by the CPU 100 at predetermined time intervals.

Specifically, the present error removal process is executed starting with a step S1 in FIG. 8 when the user turns on the power supply of the multifunction communication apparatus in the event that there occurs such an error that a reading operation or a recording operation is stopped for some cause, such as a paper jam, power failure occurring during the reading operation or the recording operation, or forced stoppage of the reading operation or the recording operation, while a conveying medium remains on the shared conveying path.

First, it is determined whether or not the PES 21 is ON (step S1). If the PES 21 is not ON, the present process is immediately terminated, to carry out normal processing. On the other hand, if the PES 21 is ON, this means that an original or a recording sheet remains on the shared conveying path, and it is determined whether or not the immediately preceding operation was a reading operation (step S2). Information as to whether the immediately preceding operation was a reading operation is stored in a non-volatile memory, not shown, inside the storage section 107.

If the immediately preceding operation was a reading operation, it is determined whether or not the original jam flag is ON (step S3). If the original jam flag is ON, the notification section 105 notifies the user through the display 122 that an original jam has occurred (step S4). Then, the user is allowed to remove the error (step S5). To remove the original jam, the user presses the conveying medium discharge button 125 while taking care so as not to injure the original, to thereby remove the original jam. That is, in the case where an original is damaged by the original jam removal processing, it is difficult to completely restore the original, and therefore, the user is required to carry out the jam removal processing with more care than in the case of a recording sheet jam. For this reason, the above notification is given to the user so that he/she takes care not to injure the original.

After this, it is determined whether or not the original detecting sensor (DS) 27 is OFF (step S6). If the DS 27 is ON, it is judged that one or more originals remain on the original tray 11. Thus, discharge of originals is repeated until the DS 27 is turned off. This original discharge is carried out because, if the CS holder 26 is rotated to return to the reading standby position as the initial position in a state where one or more originals remain in the apparatus, there is a fear that an original that was passing between the CS 22 and the white reference determining member 25 during the immediately preceding reading operation is lifted upward to be injured. When the DS 27 becomes turned off and the original jam has been removed, the reading unit 30 is returned to the reading standby position as the initial position (step S7), followed by the present process being terminated. It should be noted that in the case where an original jam occurs during an original reading operation, i.e. not when the power supply is turned on, the same processing as in the steps S4 to S7 is carried out.

On the other hand, if it is determined in the step S3 that the original jam flag is not ON, the reading unit 30 is returned to the reading standby position as the initial position (step S8), and the operation mode is set to the recording mode (step S9). Then, it is determined whether or not the recording sheet jam flag is ON (step S10). If the recording sheet jam flag is OFF, the recording sheet is forcibly discharged (step S17), followed by the present process being terminated. By this processing, when it is not determined that a recording sheet jam has occurred, a recording sheet remaining in the multifunction communication apparatus is automatically discharged, whereby the operation can promptly shift to the next operation.

If it is determined in the step S2 that the immediately preceding operation was not a reading operation, it is determined whether or not the recording sheet jam flag is ON (step S11). If the recording sheet jam flag is OFF, the process proceeds to the step S17 to forcibly discharge the recording sheet, followed by the present process being terminated.

On the other hand, if it is determined in the step S10 or S11 that the recording sheet jam flag is ON, the forced discharge of the recording sheet is carried out, and the notification section 105 is caused to have the display 122 make occurrence of a printer error (step S12). The user is allowed to confirm the display contents of the display 122 and remove the printer error (step S13). Then, it is determined whether or not a stop key provided in the operating section 106 has been pressed (step S14). If the stop key has not been pressed, the process returns to the step S12 to repeat the above processing. On the other hand, if the stop key has been pressed, the operation mode is set to the recording mode, and preparations are made to shift to a recording operation (step S15). Thereafter, it is again determined whether or not the recording sheet jam flag is ON (step S16). If the recording sheet jam flag is ON, the process returns to the step S12 to repeat the above processing. On the other hand, if the recording sheet jam flag is OFF, the present process is immediately terminated. Although in the present process, mainly determinations are made as to whether a conveying medium is to be forcibly discharged depending upon the ON/OFF state of the original jam flag or the recording sheet jam flag, alternatively, it suffices to detect only whether or not one or more sheets remains in the apparatus, to carry out similar control to the above described control depending upon the detection result.

Next, a description will be given of a second embodiment of the present invention.

The multi-function communication as the reading/recording apparatus according to the second embodiment is identical in construction (FIGS. 1 to 7) with that according to the first embodiment described above but is distinguished from the latter only in the error removal process.

Figure 10A:
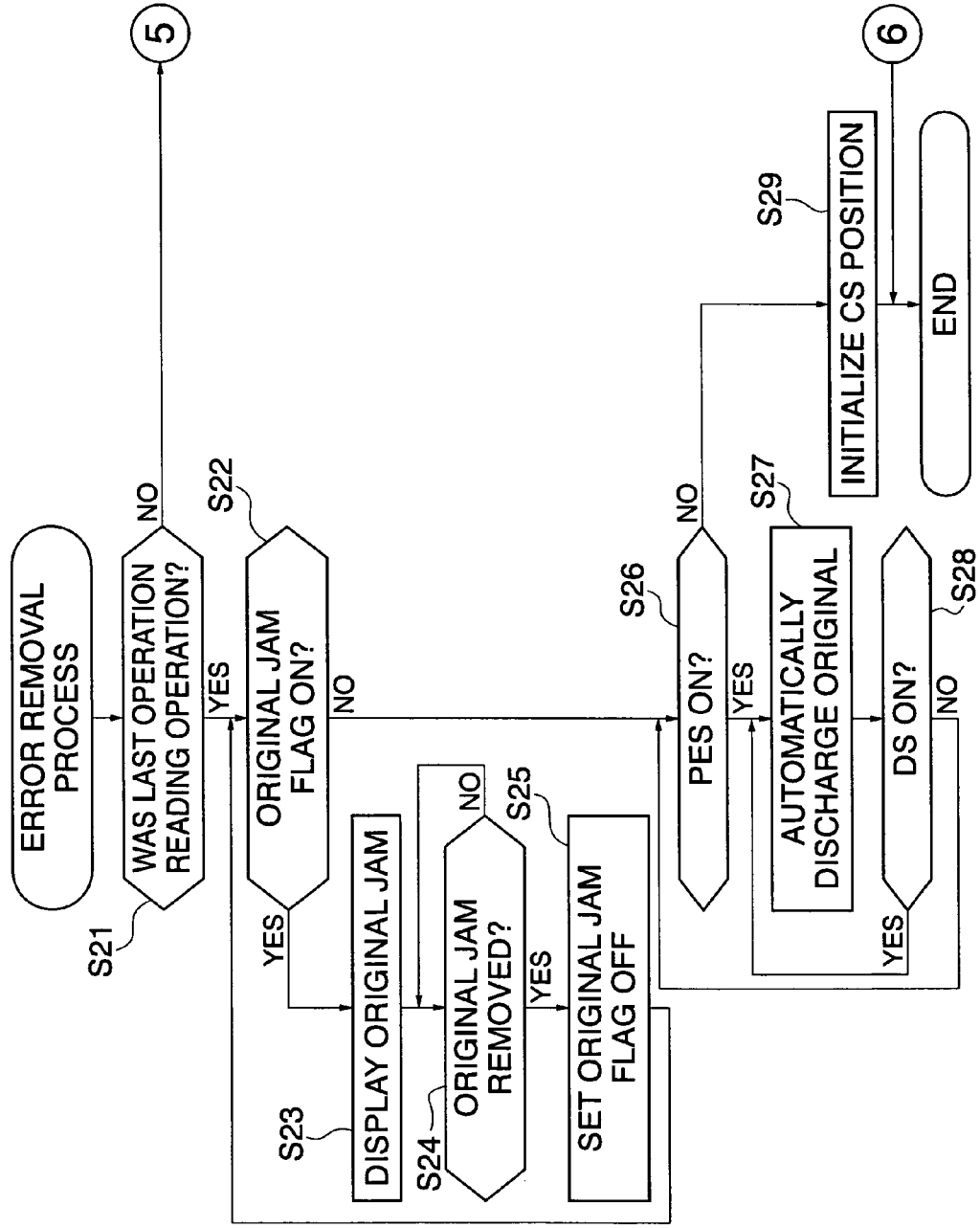
FIGS. 10A and 10B are flowchart showing the procedure of an error removal process carried out in the event that there occurs such an error that a reading operation or a recording operation is stopped for some cause, such as a paper jam, power failure occurring during the reading operation or the recording operation, or forced stoppage of the reading operation or the recording operation, while a conveying medium remains on the shared conveying path in a multifunction communication apparatus as a reading/recording apparatus according to a second embodiment of the present invention.
Figure 10B:
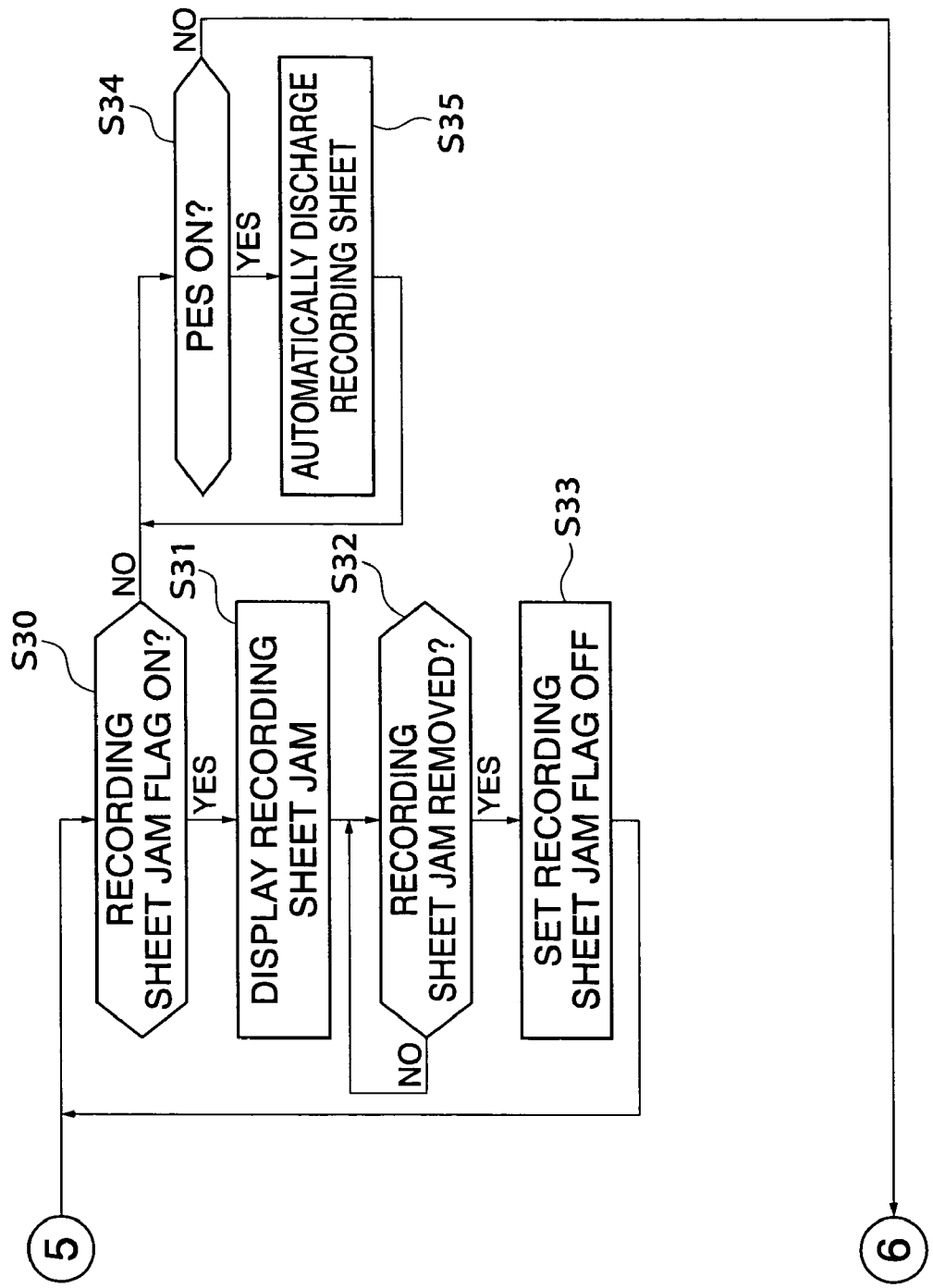
Figure 11:
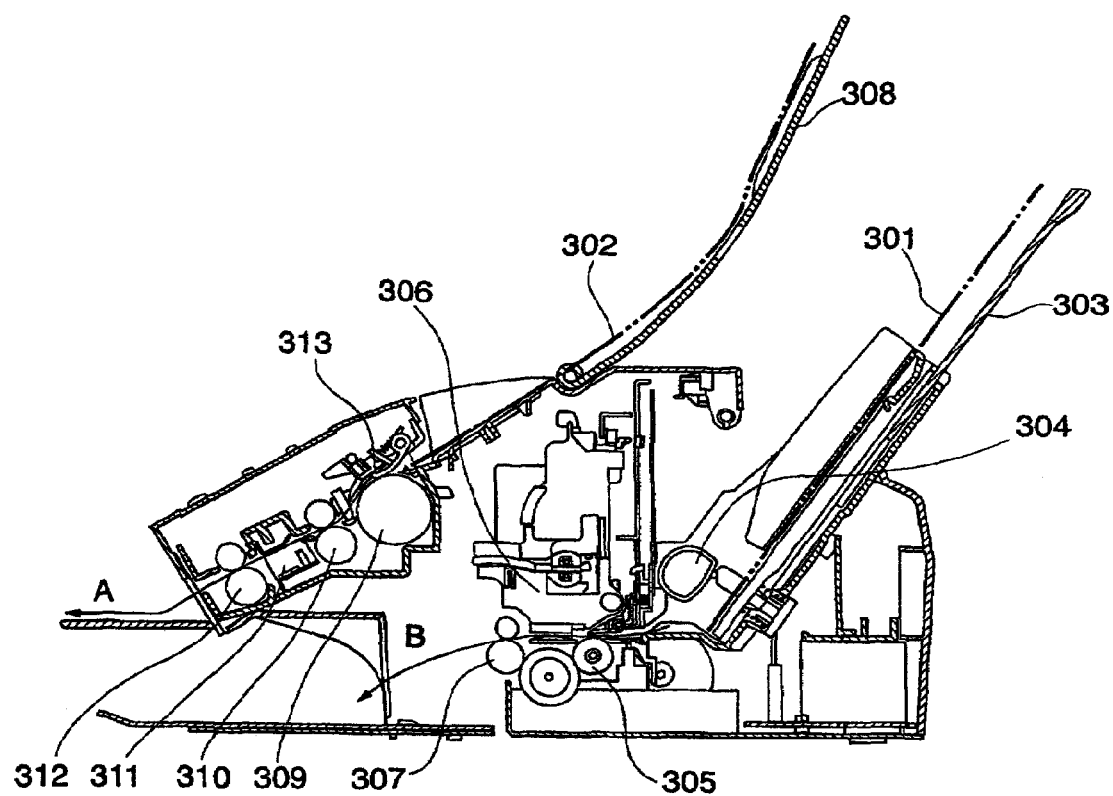

FIGS. 10A and 10B are flowchart showing the procedure of an error removal process carried out in the event that there occurs such an error that a reading operation or a recording operation is stopped for some cause, such as a paper jam, power failure occurring during the reading operation or the recording operation, or forced stoppage of the reading operation or the recording operation, while a conveying medium remains on the shared conveying path in a multi-function communication apparatus as a reading/recording apparatus according to the second embodiment. A control program for carrying out the present process is stored in the ROM inside the storage section 107 and is executed by the CPU 100.

Specifically, the present error removal process is executed starting with a step S21 in FIG. 10A when the user presses the conveying medium discharge button 125 in the event that there occurs such an error that a reading operation or a recording operation is stopped for some cause, such as a paper jam, power failure occurring during the reading operation or the recording operation, or forced stoppage of the reading operation or the recording operation, while a conveying medium remains on the shared conveying path in the multifunction communication apparatus in FIG. 1.

First, it is determined whether or not the operation mode of the multifunction communication apparatus at the time of occurrence of the above error (hereinafter referred to as "the preceding operation mode") was set to the reading mode (step S21). Information indicative of the preceding operation mode is stored in the non-volatile memory, not shown, inside the storage section 107.

If it is determined that the preceding operation mode was set to the reading mode, it is determined whether or not the original jam flag is ON (step S22). If it is determined that the original jam flag is ON, the notification section 105 is caused to have the display 122 make a predetermined original jam display that indicates the occurrence of an original jam (step S23). Then, it is determined whether or not the original jam has been removed (step S24). The processing in the step S24 is repeated until the original jam is removed.

The determination as to whether an original jam has been removed is made by checking whether the PES 21 and the DS 27 have turned off. More specifically, it is determined that an original jam has been removed when an original jam state indicated by the PES 21 remaining OFF and the DS 27 remaining ON has been removed so that the PES 21 and the DS 27 are both turned off, or when an original jam state indicated by both the PES 21 and the DS 27 remaining ON over a predetermined time period has been removed so that the PES 21 and the DS 27 are both turned off.

When the user has removed the original jam in a predetermined manner (YES to the step S24), the original jam flag is set off (step S25), followed by the processing in the step S22 et seq. being executed. In this way, in the case where an original is damaged by the original jam removal processing, it is difficult to completely restore the original, and therefore, the user is required to carry out the jam removal processing with more care than in the case of a recording sheet jam. For this reason, the above notification is given to the user so that he/she takes care not to injure the original.

If it is determined in the step S22 that the original jam flag is not ON, it is determined whether or not the PES 21 is ON (step S26). If it is determined that the PES 21 is ON, this means that an original remains on the shared conveying path, and hence the discharge roller 17 and so forth are driven to discharge the original (step S27). Then, it is determined whether or not the DS 27 is ON (step S28). If it is determined that the DS 27 is ON, the process returns to the step S27. If it is determined that the DS 27 is OFF, the process returns to the step S26.

If it is determined that the DS 27 is ON, this means that one or more originals remain on the original tray 11, and thus discharge of original(s) is repeated until the DS 27 is turned off, that is, until there is no original on the original tray 11 (steps S27, S28). This original discharge is carried out because, if the CS holder 26 is rotated to return to the reading standby position as the initial position in a state where one or more originals remain in the apparatus, there is a fear that an original that was passing between the CS 22 and the white reference determining member 25 during the immediately preceding reading operation is lifted upward to be injured.

On the other hand, if it is determined in the step S26 that the PES 21 is OFF, the CS holder 26 is rotated from the reading position to the reading standby position, that is, returned to the initial state (CS position initialization) (step S29), followed by the present process being terminated. It should be noted that, alternatively, the CS position initialization may be carried out in the step S29 when a predetermined time period has elapsed after it is determined in the step S26 that the PES 21 is OFF. That is, immediately after the PES 21 is turned off, there can be the case where an original is passing between the CS 22 and the white reference determining member 25, and if the CS position initialization is carried out at that time, the original can be damaged. Therefore, if the CS position initialization is carried out when the predetermined time period elapses after the determination that the PES 21 is OFF in the step S26, at which the original has passed between the CS 22 and the white reference determining member 25, whereby damage to the original can be prevented.

On the other hand, if it is determined in the step S21 that the preceding operation mode was not the reading mode, it is judged that it was the recording mode, and it is determined whether or not the recording sheet jam flag is ON (step S30). If it is determined that the recording sheet jam flag is ON, the notification section 105 is caused to have the display 122 make a predetermined recording sheet jam display that indicates the occurrence of a recording sheet jam to thereby notify the user of the occurrence of the recording sheet jam (step S31). Then, it is determined whether or not the recording sheet jam has been removed (step S32). This processing in the step S32 is repeated until the recording sheet jam is removed. The determination as to whether or not the recording sheet jam has been removed is carried out in the same way as the determination as to the removal of an original jam in the step S24, described earlier.

When the user has removed the recording sheet jam in a predetermined manner (YES to the step S32), the recording sheet jam flag is set off (step S33), followed by the processing in the step S30 et seq. being executed.

On the other hand, if it is determined in the step S30 that the recording sheet jam flag is not ON, it is determined whether or not the PES 21 is ON (step S34). If it is determined that the PES 21 is not ON, the present process is immediately terminated. On the other hand, if it is determined that the PES 21 is ON, this means that a recording sheet remains on the shared conveying path, and hence the discharge roller 17 and so forth are driven to discharge the recording sheet (step S35), and the process returns to the step S34. By this processing, when it is not determined that a recording sheet jam has occurred, a recording sheet remaining in the multifunction communication apparatus is automatically discharged, whereby the operation can promptly shift to the next operation.

It should be noted that in the case where the above-mentioned error has occurred in the recording mode, the recording unit 1 is returned to the home position before execution of the above error removal process.

As described above, according to the multifunction communication apparatuses of the first and second embodiments, each of which is miniaturized, by having the reading device and the recording device share a moving space on a shared conveying path used as both a conveying path for an original and a conveying path for a recording sheet, in the event that there occurs such an error that a reading operation or a recording operation is stopped for some cause, such as a paper jam, power failure occurring during the reading operation or the recording operation, or forced stoppage of the reading operation or the recording operation, while a conveying medium remains on the shared conveying path, it is possible to carry out an error removal process in a manner discriminating whether an original or a recording sheet remains on the shared conveying path, without an original being damaged. In the case of a original jam having occurred, the user is allowed to check the state of the original, and press the conveying medium discharge button (discharge key) 125 to discharge the original, whereby the original can be prevented from being damaged. Further, in the case where the above error occurs while an original remains on the shared conveying path, the original remaining on the shared conveying path is discharged manually by the user using a predetermined method or discharged automatically, and besides, original(s) on the original tray 11 is/are automatically discharged and then the CS holder 26 is rotated from the reading position to the reading standby position, that is, into the initial state, whereby the original(s) can be prevented from being damaged. Moreover, it is possible to prevent damage to an original and further occurrence of a paper jam, which are caused by the recording unit 1 being moved while an original remains on the shared conveying path. On the other hand, in the case where a recording sheet jam has occurred, the recording sheet on the shared conveying path is forcibly discharged and the stop key is pressed by the user to shift to a recording operation, whereby the operation can be promptly shifted to the next operation. Still further, in the case where the above error has occurred while a recording sheet remains on the shared conveying path, the recording sheet remaining on the shared conveying path is discharged manually by the user using a predetermined method or discharged automatically, whereby the operation can be promptly shifted to the next operation.

The present invention is not limited to the above described embodiments and can be applied to any construction that can achieve the functions described in the appended claims or the functions of the construction of either of the above described embodiments.

For example, although the present invention is applied to a multifunction communication apparatus with a facsimile communication function and a copying function in the above embodiments, the present invention is not limited to a facsimile apparatus, a copier, or the like, and can be applied to a variety of appliances that can perform a reading operation for an original and a recording operation.

The present invention may either be applied to a system composed of a plurality of apparatuses or to a single apparatus.

It is to be understood that the object of the present invention may also be accomplished by supplying a system or an apparatus with a storage medium in which a program code of software which realizes the functions of either of the above described embodiments is stored, and causing a computer (or CPU or MPU) of the system or apparatus to read out and execute the program code stored in the storage medium.

In this case, the program code itself read from the storage medium realizes the functions of any of the embodiments described above, and hence the program code and the storage medium in which the program code is stored constitute the present invention.

Examples of the storage medium for supplying the program code include a floppy (registered trademark) disk, a hard disk, an optical disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of either of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

What is claimed is:

1. A reading/recording apparatus comprising:
   a shared conveying path used as both a conveying path for an original and a conveying path for a recording medium;
   an original conveying device that conveys the original to a reading position on said shared conveying path;
   a reading device that is freely movable between the reading position and a reading standby position away from the reading position and reads an image of the original at the reading position;
   a recording medium conveying device that conveys the recording medium to a recording position on said shared conveying path;
   a recording device that is freely movable between the recording position and a recording standby position away from the recording position, and records an image on the recording medium at the recording position;
   a conveying medium detecting device that detects a conveying medium remaining on said shared conveying path;
   a remaining conveying medium determining device that determines whether the detected conveying medium remaining on said shared conveying path is the original or the recording medium;
   a discharge device that discharges the conveying medium remaining on said shared conveying path; and
   a control device that provides control to cause said discharge device to discharge the original remaining on said shared conveying path without causing said reading device to move, when said remaining conveying determining device determines that the detected conveying medium remaining on said shared conveying path is the original.

2. A reading/recording apparatus according to claim 1, wherein said control device brings said reading device into an initial state by causing said reading device to the reading standby position, after the conveying medium remaining on said shared conveying path is discharged by said discharge device.

3. A reading/recording apparatus according to claim 1, comprising an original detecting device that detects whether there is an original to be conveyed to said shared conveying path, and wherein said control device is operable when said remaining conveying medium determining device determines that the conveying medium remaining on said shared conveying path is the original, to cause said discharge device to discharge the original determined to be the conveying path remaining on said shared conveying path, and discharge the original detected to be the original to be conveyed by said original detecting device until the original to be conveyed is no longer detected.

4. A reading/recording apparatus according to claim 1, comprising a discharge instructing device that gives an instruction for discharging the conveying medium, and wherein said control device is responsive to the instruction for discharging the conveying medium given by said discharge instructing device, for causing said discharge device to discharge the conveying medium remaining on said shared conveying path.

5. A reading/recording apparatus according to claim 1, comprising a notifying device that notifies that there is an original remaining on said shared conveying path.

6. A reading/recording apparatus according to claim 1, comprising a rotary shaft extending in a main scanning direction, and wherein said reading device is freely rotatable about said rotary shaft between the reading position and the reading standby position, and said control device is operable when an image of the original at the reading position on said shared conveying path has been read by said reading device, to cause said reading device to move to the reading standby position away from the reading position.

7. A reading/recording apparatus according to claim 1, wherein said reading device comprises an image detecting device that detects an image of the original, and a white reference determining device that determines a white reference level of the image detected by said image detecting device, and wherein said original conveying device is operable when said reading device reads the image of the original at the reading position, to cause the original to pass between said image detecting device and said white reference determining device.

8. A reading/recording apparatus according to claim 1, wherein said control device is operable when the conveying medium remaining on said shared conveying path is detected to be the recording medium by said conveying medium detecting device, to cause said discharge device to discharge the recording medium as the conveying medium remaining on said shared conveying path.

9. A reading/recording apparatus according to claim 8, wherein said control device is operable when a predetermined operation has been carried out after discharge of the recording medium as the conveying medium remaining on said shared conveying path, to shift the reading/recording apparatus into a recording mode.

10. A reading/recording apparatus according to claim 1, wherein said recording device shares a moving space on said shared conveying path with said reading device.

11. A reading/recording control method for a reading/recording apparatus including a shared conveying path used as both a conveying path for an original and a conveying path for a recording medium, a reading device that is freely movable between a reading position and a reading standby position away from the reading position and reads an image of the original at the reading position, and a recording device that is freely movable between a recording position and a recording standby position away from the recording position, and records an image on the recording medium at the recording position, the method comprising:

an original conveying step of conveying the original to the reading position on the shared conveying path;

a reading step of causing the reading device to read an image of the original at the reading position;

a recording medium conveying step of conveying the recording medium to the recording position on the shared conveying path;

a conveying medium detecting step of detecting a conveying medium remaining on the shared conveying path;

a remaining conveying medium determining step of determining whether the detected conveying medium remaining on the shared conveying path is the original or the recording medium; and a discharging step of discharging the original as the conveying medium remaining on the shared conveying path without causing the reading device to move, when in said remaining conveying determining step it is determined that the detected conveying medium remaining on the shared conveying path is the original.

12. A computer readable medium encoded with a computer program to execute a reading/recording method according to claim 11.

* * * * *